(12) United States Patent
Chen

(10) Patent No.: US 11,096,460 B2
(45) Date of Patent: Aug. 24, 2021

(54) SHOCKPROOF LAPTOP BAG

(71) Applicant: Guangzhou Fengping Computer Co., Ltd., Guangdong (CN)

(72) Inventor: Daping Chen, Guangdong (CN)

(73) Assignee: Guangzhou Fengping Computer Co., Ltd., Guangzhou (CN)

( * ) Notice: Subject to any disclaimer, the term of this patent is extended or adjusted under 35 U.S.C. 154(b) by 416 days.

(21) Appl. No.: 16/207,145

(22) Filed: Dec. 2, 2018

(65) Prior Publication Data

US 2019/0174892 A1    Jun. 13, 2019

(30) Foreign Application Priority Data

Dec. 8, 2017   (CN) .......................... 201721721520.7
Aug. 16, 2018   (CN) .......................... 201810932028.7

(51) Int. Cl.
| | |
|---|---|
| *A45C 11/00* | (2006.01) |
| *A45C 13/02* | (2006.01) |
| *A45C 13/10* | (2006.01) |
| *B32B 5/18* | (2006.01) |
| *B32B 9/02* | (2006.01) |
| *B32B 9/04* | (2006.01) |
| *B32B 27/30* | (2006.01) |
| *B32B 5/02* | (2006.01) |
| *A45C 5/02* | (2006.01) |
| *A45C 13/36* | (2006.01) |

(52) U.S. Cl.
CPC ................ *A45C 11/00* (2013.01); *A45C 5/02* (2013.01); *A45C 13/02* (2013.01); *A45C 13/103* (2013.01); *A45C 13/36* (2013.01); *B32B 5/02* (2013.01); *B32B 5/18* (2013.01); *B32B 9/025* (2013.01); *B32B 9/045* (2013.01); *B32B 27/306* (2013.01); *A45C 2011/003* (2013.01); *B32B 2266/025* (2013.01); *B32B 2307/558* (2013.01); *B32B 2439/46* (2013.01)

(58) Field of Classification Search
CPC ..... A45C 2011/003; A45C 11/00; A45C 5/02; A45C 13/103; A45C 13/36
See application file for complete search history.

(56) References Cited

U.S. PATENT DOCUMENTS

| | | | | |
|---|---|---|---|---|
| 5,010,988 A | * | 4/1991 | Brown .................... | A45C 3/00 |
| | | | | 190/104 |
| 5,139,838 A | * | 8/1992 | Baum ..................... | A45C 5/02 |
| | | | | 428/72 |

(Continued)

*Primary Examiner* — James N Smalley
*Assistant Examiner* — Jennifer Castriotta

(57) ABSTRACT

This invention provides a laptop bag, which includes a shockproof front panel, a shockproof rear panel and a shockproof connecting panel which connects the shockproof front panel and the shockproof rear panel. The shockproof front panel, the shockproof rear panel and the shockproof connecting panel are enclosed to form a placement space for placing a laptop. The shockproof connecting panel is provided with an opening means for putting a laptop in the placement space or taking out the laptop from the placement space. The shockproof front panel, the shockproof rear panel and the shockproof connecting panel each is provided with a first shockproof layer, a plurality of protrusions made of a shockproof material are provided on the first shockproof layer. The laptop bag can achieve the purpose of protecting lateral surfaces of the laptop.

6 Claims, 2 Drawing Sheets

(56) References Cited

U.S. PATENT DOCUMENTS

| | | | | |
|---|---|---|---|---|
| 5,494,157 | A * | 2/1996 | Golenz | A45F 3/04 |
| | | | | 206/320 |
| 5,909,806 | A * | 6/1999 | Fischel | A45C 11/00 |
| | | | | 206/320 |
| 6,375,009 | B1 * | 4/2002 | Lee | A45C 13/021 |
| | | | | 206/522 |
| 2005/0284791 | A1 * | 12/2005 | Sadow | A45C 13/021 |
| | | | | 206/522 |
| 2008/0230160 | A1 * | 9/2008 | Huang | A45C 11/00 |
| | | | | 150/165 |
| 2009/0032421 | A1 * | 2/2009 | Sween | A45C 5/03 |
| | | | | 206/320 |
| 2010/0089779 | A1 * | 4/2010 | Bowers | A45C 13/02 |
| | | | | 206/320 |
| 2013/0105354 | A1 * | 5/2013 | Wyner | B65D 81/1275 |
| | | | | 206/586 |
| 2018/0324986 | A1 * | 11/2018 | Yvanova | H05K 9/0083 |

* cited by examiner

SHOCKPROOF LAPTOP BAG

CROSS REFERENCE TO RELATED APPLICATIONS

The present application claims the benefit of Chinese patent application No. 201810932028.7 filed on Aug. 16, 2018 and No. 201721721520.7 filed on Dec. 8, 2017. All the above are hereby incorporated by reference.

FIELD OF THE INVENTION

The invention relates to the field of laptop bag, in particular to a shockproof laptop bag.

BACKGROUND OF THE INVENTION

With the popularization of laptop, functions of laptop bag are becoming diversified.

When carrying the laptop, the collision should be minimized to prevent vibration, so as to protect internal components of the laptop and extend the life of the laptop. However, when carrying the laptop, as the space in the laptop bag is relatively abundant, it is inevitable for the laptop to be bumped or impacted. An existing laptop bag is provided with a shockproof cushion to alleviate the impact of the collision on the internal components of the laptop, but the shockproof cushion usually only covers two inner surfaces of the laptop bag to prevent collision on a top surface and a bottom surface of the laptop while the lateral surfaces of the laptop cannot be effectively protected. Sometimes the laptop bumps in the laptop bag and directly touches metal structures of the laptop bag, such as the zippers on the bag, and that will cause further damage to the laptop.

SUMMARY OF THE INVENTION

The technical problem to be solved by the present invention is to provide a shockproof laptop bag, which can achieve the purpose of protecting lateral surfaces of the laptop.

In order to solve the above technical problems, the present invention provides a shockproof laptop bag, which comprises a shockproof front panel, a shockproof rear panel and a shockproof connecting panel which connects the shockproof front panel and the shockproof rear panel. The shockproof front panel, the shockproof rear panel and the shockproof connecting panel are enclosed to form a placement space for placing a laptop. The shockproof connecting panel is provided with an opening means for putting a laptop in the placement space or taking out the laptop from the placement space. The shockproof front panel, the shockproof rear panel and the shockproof connecting panel each is provided with a first shockproof layer, a plurality of protrusions made of a shockproof material are provided on the first shockproof layer.

Preferably, the opening means is a zipper.

Preferably, the shockproof front panel, the shockproof rear panel and the shockproof connecting panel each comprises, from external to internal, a waterproof layer, a first shock reducing layer, a first buffering layer, the first shockproof layer and a first contacting layer, the first contacting layer directly contacts with the laptop.

Preferably, the first contacting layer is made of flexible fiber, the first buffering layer is made of EPE (expandable polyethylene), the first shock reducing layer is made of sponge, the first shockproof layer is made of EVA (ethylene vinyl acetate), and the waterproof layer is made of waterproof fabric or leather.

Preferably, each of four edges of the shockproof front panel and the shockproof rear panel is provided with a protruded shockproof bar.

Preferably, the shockproof bar comprises, from external to internal, a second contacting layer, a second buffering layer, and a second shock reducing layer.

Preferably, the second contacting layer is made of flexible fiber, the second buffering layer is made of EPE, and the second shock reducing layer is made of sponge.

Preferably, a cross section of the protrusion has a circular shape, a polygonal shape or a rectangular shape.

Preferably, an external surface of the shockproof front panel is further provided with a zippered pocket.

A shockproof laptop bag embodying the present invention has the following beneficial effects compared to the prior art. A shockproof laptop bag of the present invention comprises a shockproof front panel, a shockproof rear panel and a shockproof connecting panel which connects the shockproof front panel and the shockproof rear panel. The shockproof front panel, the shockproof rear panel and the shockproof connecting panel are enclosed to form a placement space for placing a laptop. The shockproof connecting panel is provided with an opening means for putting a laptop in the placement space or taking out the laptop from the placement space. The shockproof front panel, the shockproof rear panel and the shockproof connecting panel each is provided with a first shockproof layer, a plurality of protrusions made of a shockproof material are provided on the first shockproof layer. When the laptop is placed in the placement space of the laptop bag, the front shockproof panel and the shockproof rear panel cover a top surface and a bottom surface of the laptop respectively; the shockproof connecting panel is wrapped around lateral surfaces of the laptop. The front shockproof panel, the shockproof rear panel and the shockproof connecting panel cooperate to protect the laptop in all directions. When the bag is impacted by an impact force, the impact force is transmitted to the shockproof front panel, the shockproof rear panel and the shockproof connecting panel, which effectively decomposes and buffers the impact force to prevent the internal components of the laptop from being damaged by the impact force.

BRIEF DESCRIPTION OF THE DRAWINGS

In order to more clearly illustrate the technical solutions of the embodiments of the present invention, the drawings of the embodiments will be briefly described below.

DETAILED DESCRIPTION OF ILLUSTRATED EMBODIMENTS

Figure 1:
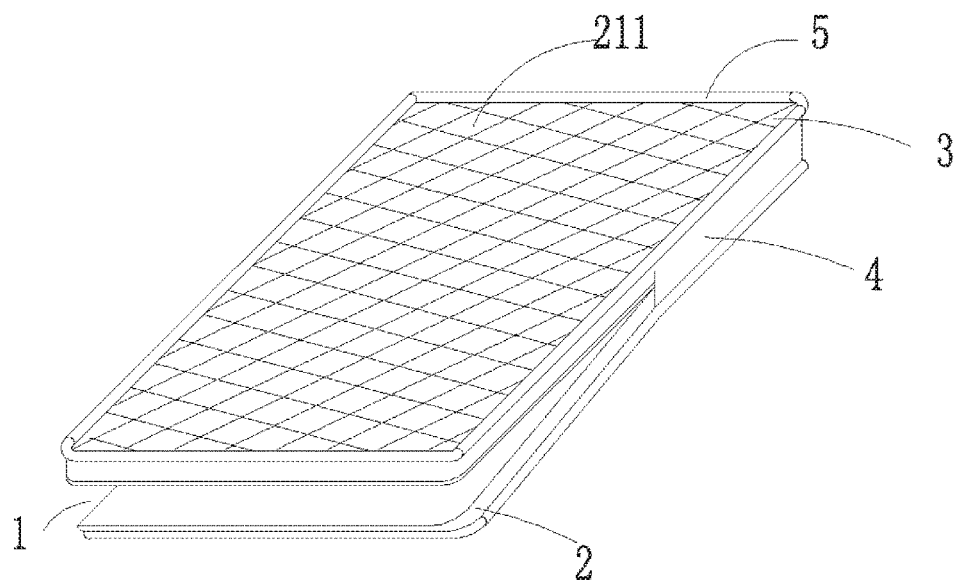
FIG. 1 is a schematic diagram of internal structures of a shockproof laptop bag according to an embodiment of the present invention, showing the shockproof laptop bag turned inside out.
Figure 2:
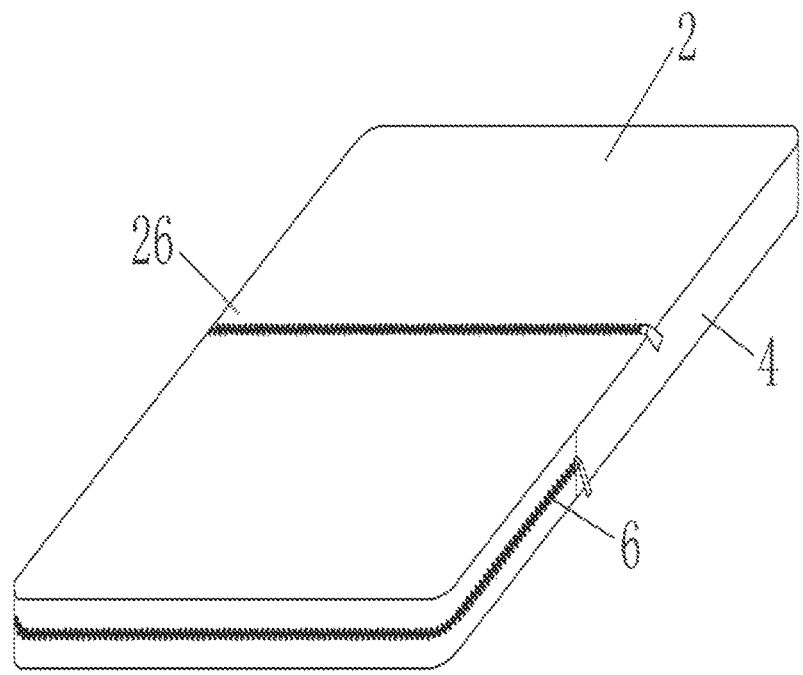
FIG. 2 is a schematic diagram of external structures of a shockproof laptop bag according to an embodiment of the present invention.

The technical solutions of the embodiments of the present invention will be clearly and completely explained below in conjunction with the figures of the embodiments. It is apparent that the described embodiments are merely some embodiments of the present invention, but are not to limit the invention in any form. On the basis of these embodiments of the present invention, those skilled in the art may get other equivalent embodiments without involving any inventive step. The present invention is intended to cover all equivalent arrangements included within the scope of the present invention.

Referring to FIGS. 1 to 4, a shockproof laptop bag of this embodiment comprises a shockproof front panel 2, a shockproof rear panel 3 and a shockproof connecting panel 4 which connects the shockproof front panel 2 and the shockproof rear panel 3. The shockproof front panel 2, the shockproof rear panel 3 and the shockproof connecting panel 4 are enclosed to form a placement space 1 for placing a laptop. The shockproof connecting panel 4 is provided with an opening means for putting a laptop in the placement space 1 or taking out the laptop from the placement space 1. The shockproof front panel 2, the shockproof rear panel 3 and the shockproof connecting panel 4 each is provided with a first shockproof layer 21, a plurality of protrusions 211 made of a shockproof material are provided on the first shockproof layer 21.

When the laptop is placed in the placement space 1 of the laptop bag, the front shockproof panel 2 and the shockproof rear panel 3 cover a top surface and a bottom surface of the laptop respectively; the shockproof connecting panel 4 is wrapped around lateral surfaces of the laptop. The front shockproof panel 2, the shockproof rear panel 3 and the shockproof connecting panel 4 cooperate to protect the laptop in all directions. When the bag is impacted by an impact force, the impact force is transmitted to the shockproof front panel 2, the shockproof rear panel 3 and the shockproof connecting panel 4, which effectively decomposes and buffers the impact force to prevent the internal components of the laptop from being damaged by the impact force.

In this embodiment, the opening means is a zipper 6, which joins or separates two sides of the shockproof connecting panel 4. After doing up the zipper 6, a sealed space is generated in the laptop bag, which can effectively prevent the laptop from falling out of the laptop bag; when the laptop needs to be taken out, the zipper 6 can be undone directly. This operation is simple and convenient.

Figure 3:
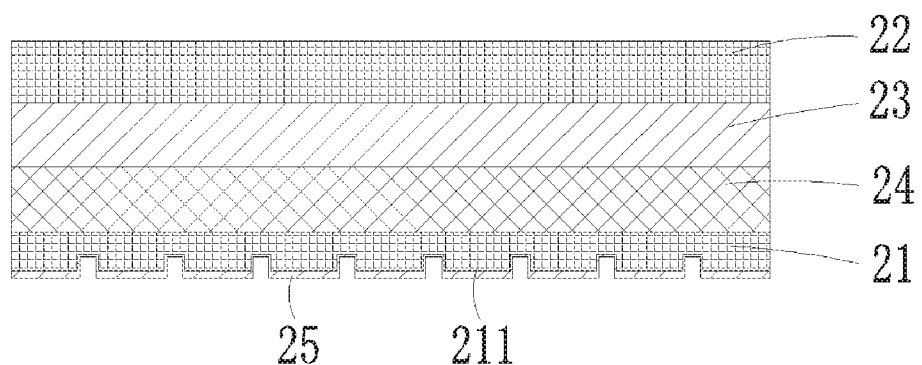
FIG. 3 is a schematic diagram of a shockproof front panel, a shockproof rear panel and a shockproof connecting panel of a shockproof laptop bag according to an embodiment of the present invention.

Referring to FIG. 3, in this embodiment, the shockproof front panel 2, the shockproof rear panel 3 and the shockproof connecting panel 4 each comprises, from external to internal, a waterproof layer 22, a first shock reducing layer 23, a first buffering layer 24, the first shockproof layer 21 and a first contacting layer 25, the first contacting layer 25 directly contacts with the laptop.

More preferably, the first contacting layer 25 is made of flexible fiber, the first buffering layer 24 is made of EPE (expandable polyethylene), the first shock reducing layer 23 is made of sponge, the first shockproof layer 21 is made of EVA (ethylene vinyl acetate), and the waterproof layer 22 is made of waterproof fabric or leather.

In this embodiment, referring to FIG. 1 which shows the shockproof laptop bag turned inside out, each of four edges of the shockproof front panel 2 and the shockproof rear panel 3 is provided with a protruded shockproof bar 5. By providing the shockproof bar 5, the laptop is isolated from inner surfaces of the bag and will not touch metal structures of the bag, so that the lateral surfaces of the laptop can be further protected.

Figure 4:
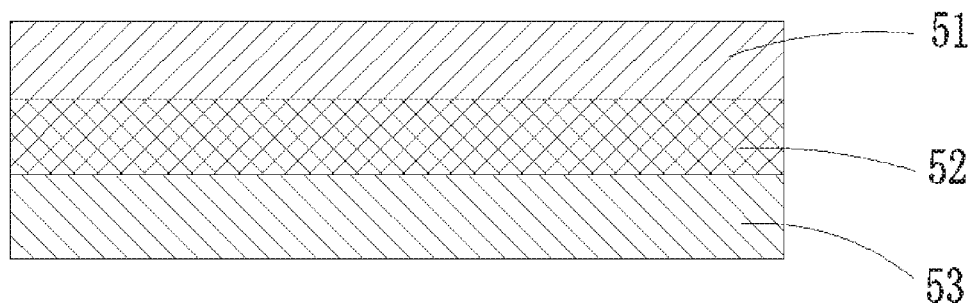
FIG. 4 is a schematic diagram of a shockproof bar of a shockproof laptop bag according to an embodiment of the present invention.

Referring to FIG. 4, the shockproof bar 5 comprises, from external to internal, a second contacting layer 51, a second buffering layer 52 and a second shock reducing layer 53. More preferably, the second contacting layer 51 is made of flexible fiber, the second buffering layer 52 is made of EPE, and the second shock reducing layer 53 is made of sponge.

Specifically, the first buffering layer 24 and the second buffering layer 52 are made of EPE. EPE can protect the laptop bag from shock and water, and further protects the laptop placed in the laptop bag from damage. The first buffering layer 24 and the second buffering layer 52 may also be made of silica gel.

The first shock reducing layer 23 and the second shock reducing layer 53 are made of sponge. Sponge is soft and elastic, so that the shockproof performance of the laptop bag can be further optimized.

The first contacting layer 25 and the second contacting layer 51 are made of flexible fiber. Since the first contacting layer 25 and the second contacting layer 51 are directly in contact with the laptop, the first contacting layer 25 and the second contacting layer 51 made of flexible fiber can act as buffers to the laptop, will not scratch the laptop, and are comfortable to touch.

The first shockproof layer 21 is made of EVA. EVA has the advantages of good cushioning, shock resistance, moisture resistance, etc., so that the shockproof laptop bag can have excellent shock resistance performance.

In addition, the waterproof layer 22 is made of waterproof fabric or leather. The waterproof fabric or leather has functions of waterproofing and scratch proofing.

In this embodiment, a cross section of the protrusion 211 has a circular shape, a polygonal shape or a rectangular shape. In actual production, it can be produced on demand.

In this embodiment, an external surface of the shockproof front panel 2 is further provided with a zippered pocket 26 to receive some personal belongings, which is functional.

The above disclosed embodiments are merely preferred embodiments of the present invention, and certainly do not limit the scope of the present invention. Therefore, equivalent changes made according to the scope of the present invention for patent application still fall within the scope of the present invention.

What is claimed is:

1. A shockproof laptop bag, comprising a shockproof front panel, a shockproof rear panel and a shockproof connecting panel which connects the shockproof front panel and the shockproof rear panel; wherein the shockproof front panel, the shockproof rear panel and the shockproof connecting panel are enclosed to form a placement space for placing a laptop;

the shockproof connecting panel is provided with a zipper for putting the laptop in the placement space or taking out the laptop from the placement space;

the shockproof front panel, the shockproof rear panel and the shockproof connecting panel each is provided with a first shockproof layer;

a plurality of protrusions made of a shockproof material are provided on the first shockproof layer;

each of four edges of the shockproof front panel and the shockproof rear panel is provided with a protruded shockproof bar;

wherein the shockproof front panel, the shockproof rear panel and the shockproof connecting panel each comprises, from external to internal, a waterproof layer, a first shock reducing layer, a first buffering layer, the first shockproof layer and a first contacting layer, the first contacting layer directly contacts with the laptop.

2. The shockproof laptop bag according to claim 1, wherein the first contacting layer is made of flexible fiber, the first buffering layer is made of expandable polyethylene, the first shock reducing layer is made of sponge, the first shockproof layer is made of ethylene vinyl acetate, and the waterproof layer is made of waterproof fabric or leather.

3. The shockproof laptop bag according to claim 1, wherein the shockproof bar comprises, from external to internal, a second contacting layer, a second buffering layer, and a second shock reducing layer.

4. The shockproof laptop bag according to claim 3, wherein the second contacting layer is made of flexible fiber, the second buffering layer is made of expandable polyethylene, and the second shock reducing layer is made of sponge.

5. The shockproof laptop bag according to claim 1, wherein a cross section of the protrusion has a circular shape, a polygonal shape or a rectangular shape.

6. The shockproof laptop bag according to claim 1, wherein an external surface of the shockproof front panel is further provided with a zippered pocket.

\* \* \* \* \*